United States Patent
Sullivan et al.

(12)

(10) Patent No.: US 6,245,368 B1
(45) Date of Patent: Jun. 12, 2001

(54) PRE-ASSEMBLED SANDWICH BULK PACKAGING AND METHOD OF SALE

(75) Inventors: B. Keith Sullivan; Steven A. Corley, both of Ooltewah, TN (US)

(73) Assignee: Made-Rite Sandwich Company of Chattanooga, Inc., Ooltewah, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/625,230

(22) Filed: Jul. 24, 2000

Related U.S. Application Data

(63) Continuation-in-part of application No. 09/045,006, filed on Mar. 20, 1998, now Pat. No. 6,093,431.

(51) Int. Cl.[7] .............................. A21D 13/08; B65B 11/02
(52) U.S. Cl. .................... 426/118; 426/396; 426/410; 426/413; 426/415; 426/496
(58) Field of Search ..................................... 426/118, 396, 426/410, 413, 415, 496; 53/555; 62/246

(56) References Cited

U.S. PATENT DOCUMENTS

| | | | | |
|---|---|---|---|---|
| 3,850,486 | * | 11/1974 | Brown | 426/106 |
| 3,964,669 | * | 6/1976 | Sontag et al. | 229/40 |
| 4,355,721 | * | 10/1982 | Knott, II et al. | 206/524.2 |
| 4,608,302 | * | 8/1986 | Schirmer | 428/349 |
| 4,792,457 | * | 12/1988 | Brna et al. | 426/574 |
| 5,345,069 | * | 9/1994 | Grindrod | 219/730 |
| 5,514,392 | * | 5/1996 | Garwood et al. | 426/106 |
| 5,553,934 | * | 9/1996 | Wells et al. | 312/128 |

* cited by examiner

*Primary Examiner*—Nina Bhat
(74) *Attorney, Agent, or Firm*—Miller & Martin LLP

(57) ABSTRACT

A new and improved bulk sandwich package and method of packaging and merchandising is provided. A plurality of sandwiches are individually wrapped in gas permeable wrap and then bulk packaged in a modified atmosphere process, refrigerated and distributed to store locations or merchandisers where the bulk packages are refrigerated until needed, opened and placed in a refrigerated merchandiser for sale. The refrigerated merchandiser therefore provides consumers with a deli-style sandwich in stores without kitchen facilities, and permits the self-service purchase of the pre-assembled sandwiches.

18 Claims, 4 Drawing Sheets

PRE-ASSEMBLED SANDWICH BULK PACKAGING AND METHOD OF SALE

The present application is a continuation-in-part of U.S. Ser. No. 09/045,006, filed Mar. 20, 1998 now U.S. Pat. No. 6,093,431.

BACKGROUND OF THE INVENTION

The present invention relates to the packaging of pre-assembled sandwiches and methods for their distribution and sale.

A popular prepared food item is a sandwich or submarine sandwich, typically containing meat and/or cheese. Deli type restaurants or in-store deli counters prepare sandwiches on site, either to order, or daily in advance of the order, and then maintain the sandwiches in refrigerated holding bins or displays. Gas stations, convenience stores, quick service food marts, airport shops, food marts, vending machines and other small retail locations without kitchen facilities, compete for these sandwich sales. Heretofore, such locations have been unable to economically present the consumer with completely satisfactory sandwiches. The most typical competitive sandwich offerings have been sold in a refrigerated state to the consumer in sealed, clear plastic packaging, with one sandwich per package. Such sandwiches have sometimes been packaged in modified atmosphere packaging to extend their shelf life in a refrigerated store display or vending machine.

Alternative bulk packaging of 4,6,12 or even 24 sandwiches individually wrapped in regular atmosphere packaging and sold frozen in cardboard boxes for thawing by consumers in their homes also exist, and are most commonly sold in warehouse club type stores. These sandwiches rely upon freezing for their shelf life. No refrigerated bulk packaged sandwich products are known to be individually wrapped within a larger modified atmosphere package.

In order to present a satisfactory product, many factors must be addressed. The meat and cheese components of the sandwich must be selected such that they will have a substantial shelf life when properly packaged, and such that when opened from the bulk container and placed in a refrigerated merchandiser will not deteriorate too rapidly. In addition, bulk packaging for the sandwiches must be inexpensive, preferably transparent, flexible, and providing a barrier to oxygen and moisture, as well as sufficient toughness for casual handling and storage for a 3 to 5 week period. In addition, the sandwiches should preferably be individually wrapped with a clear shrink wrap film or other gas permeable wrapper for store and consumer convenience in handling the individual sandwich products. Finally, because demand is uncertain, the sandwich products must be maintained in a palatable condition during several days of display.

SUMMARY OF THE INVENTION

Accordingly, it is an object of the invention to provide an improved sandwich for bulk packaging and subsequent individual sale from a refrigerated merchandiser. It is a further object of the invention to provide improved packaging for bulk sandwiches which are to be individually sold from a refrigerated merchandiser.

It is yet another object of the invention to provide an improved method of distributing and selling pre-assembled sandwiches from retail outlets that do not have on-site kitchen capabilities.

It is still another object of the present invention to provide bulk packaged, pre-assembled sandwiches for individual sale at a self-service counter food display station without requiring additional handling or assistance by store personnel.

It is a further object of the invention to provide bulk pre-assembled sandwiches with a refrigerated shelf life of at least about 30 days. In accordance with these objects of the invention, sandwiches with meat, cheese, or spread components and bread components are provided. These sandwiches are individually wrapped in gas permeable wrapper and placed in plastic web sleeves with modified atmospheres, wherein the sleeves provide barriers against moisture and oxygen sufficient to provide a refrigerated shelf life of at least 20 days. The packaged sandwiches are distributed to retail store locations and merchandisers with instructions describing display and placement of the product in a refrigerated merchandiser from which customers may make their selections without assistance by store personnel.

DETAILED DESCRIPTION OF THE PREFERRED EMBODIMENT

Figure 1:
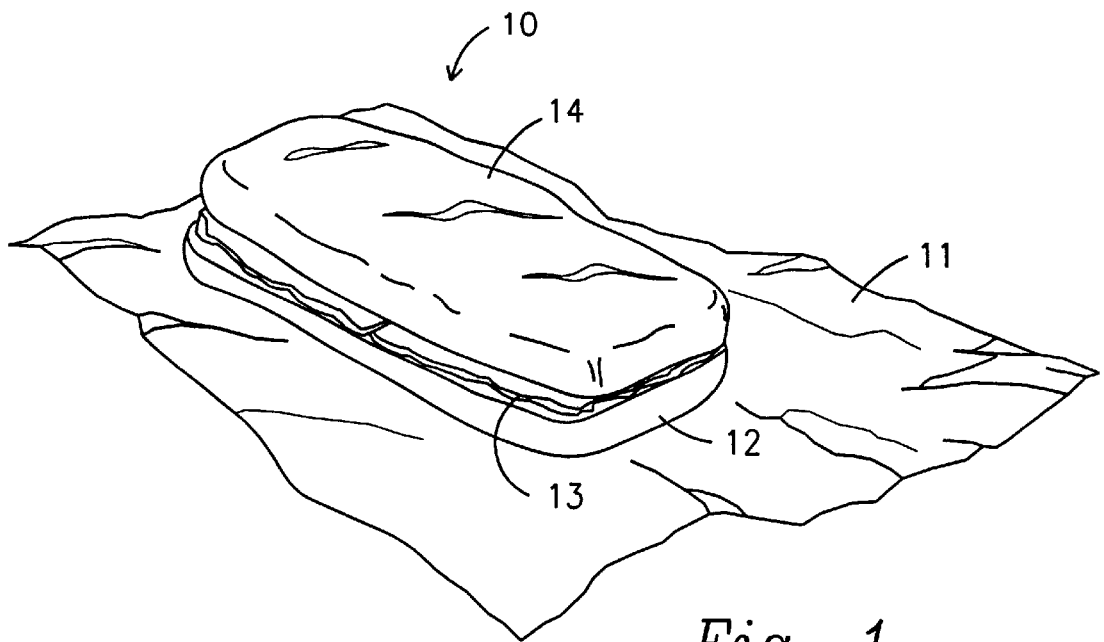
FIG. 1 is a perspective view of an assembled sandwich ready for wrapping.
Figure 2:
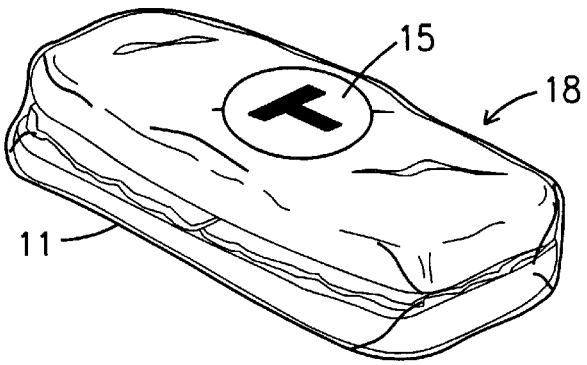
FIG. 2 is a perspective view of an individually wrapped sandwich.

FIG. 1 shows a typical sandwich 10, comprising a bottom 12, top 14, and a meat portion 13 and a cheese portion 31 in between. The meat portion 13 will typically be turkey, chicken, roast beef or ham, and is already cooked at the time the sandwich is assembled. The sandwich may also be prepared with only a cheese portion, or with suitable spreads such as egg salad, chicken salad, tuna salad or pimento cheese The meat, cheese, and spread portions are collectively referred to as the fillings. The bread components 12, 14, may be selected from any of a number of bread products, but preferably comprise a submarine type bun. The sandwich 10 in FIG. 1 is shown with a waxed paper type wrapper, and is shown in other Figures in gas permeable wrapping 11, which is preferably a clear heat shrink film material. The wrapper 11 should be gas permeable to permit the later described modified atmosphere bulk packaging to perform most effectively. The wrapper 11 should have a pleasant tactile feel to the outer surface and insulate the sandwich from incidental handling contact. The assembled sandwich with meat and/or cheese and bread will preferably weigh between about 4 and 12 ounces. In FIG. 2, the sandwich 10 has been wrapped and the wrapped sandwich 18 is shown with wrapper 11 of clear heat shrink film. A sticker 15 designates the type of meat and/or cheese on the sandwich. The sticker 15 may be separate and placed on the wrapped sandwich 18 when heat shrink film is used, or may be preprinted on the outer surface of paper wrappers, together with a listing of ingredients and nutritional information. Preferably the sticker 15 will be on the bottom of the wrapped sandwiches 18.

Figure 3:
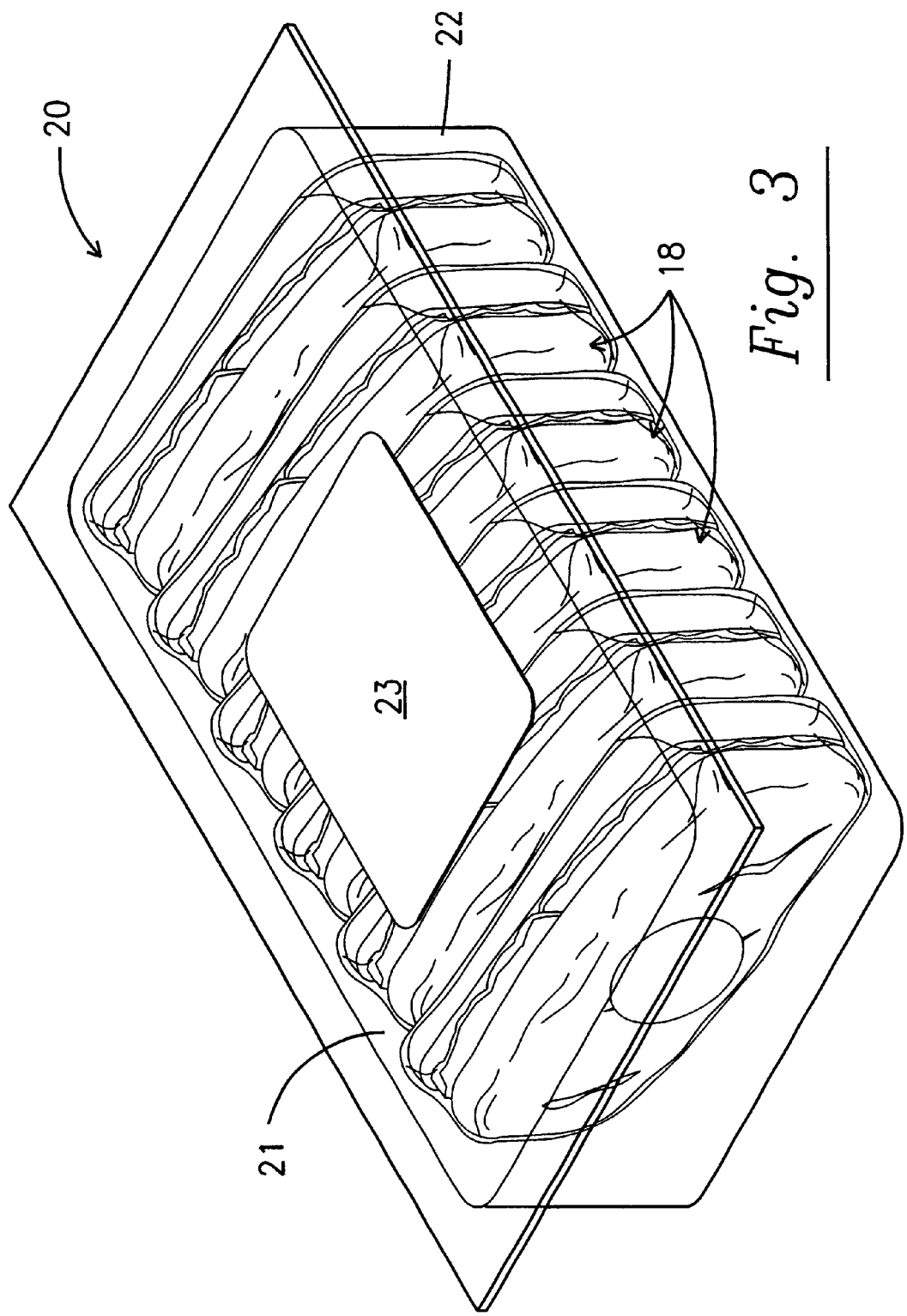
FIG. 3 is a perspective view of a package of wrapped sandwiches in a plastic web sleeve according to the present invention.

The wrapped sandwiches 18 are then bulk packaged in a container for distribution. As shown in FIG. 3, the preferable form of packaging is to place a plurality of wrapped sandwiches 18 in a plastic sleeve 20, composed of a top web 21, and a bottom web 22. This is commonly referred to as form, fill and seal packaging. Preferably, approximately 3 to 12 sandwiches 18 are placed in a single sleeve 20, with 5 to 8 sandwiches per package being the most desirable range. This represents a compromise between the convenience of the store operator in retaining and opening bulk packages of sandwiches, and the possible waste that will occur if sandwich sales do not achieve the level necessary to sell all of the sandwiches 18 in a package 20 within their opened refrigerated display shelf life. The number of sandwiches 18 placed in a single package 20 is not critical, however, and may be varied according to the equipment of the manufacturer and the size of the sandwiches 18.

Preferably the packages 20 will be filled in a modified atmosphere process, with minimal oxygen content between about 0.2 to 0.5 percent to retard spoilage. Vacuum packaging with similar oxygen content may also be possible. Because the sandwiches 18 have gas permeable wrappers, the modified atmosphere or vacuum packaging also reduces the oxygen content within the individual sandwich, thereby controlling bacteria growth.

The top web 21 and bottom web 22 should be selected from appropriate materials to provide oxygen and moisture barriers, sufficient strength to resist puncture from handling, and preferably will be transparent, provide a peelable seal between the top 21 and bottom 22 webs, and permit the printing of graphics, instructions, and other necessary information on the packaging. In accordance with these requirements, the top web 21 is preferably a 50 gram SARAN-coated polyester film, with the top surface printed with contents and instructions 23 and the bottom surface having an adhesive and a 0.0025 inch peelable low-density polyethylene ("LDPE") layer. This top web 21 is joined to the bottom web 22 which is preferably a 0.007 inch think 3-layer sandwich material, having a nylon outer layer, an ethylene vinyl alcohol copolymer ("EVOH") center layer, and an LDPE inner surface which mates with upper web 21.

Figure 4:
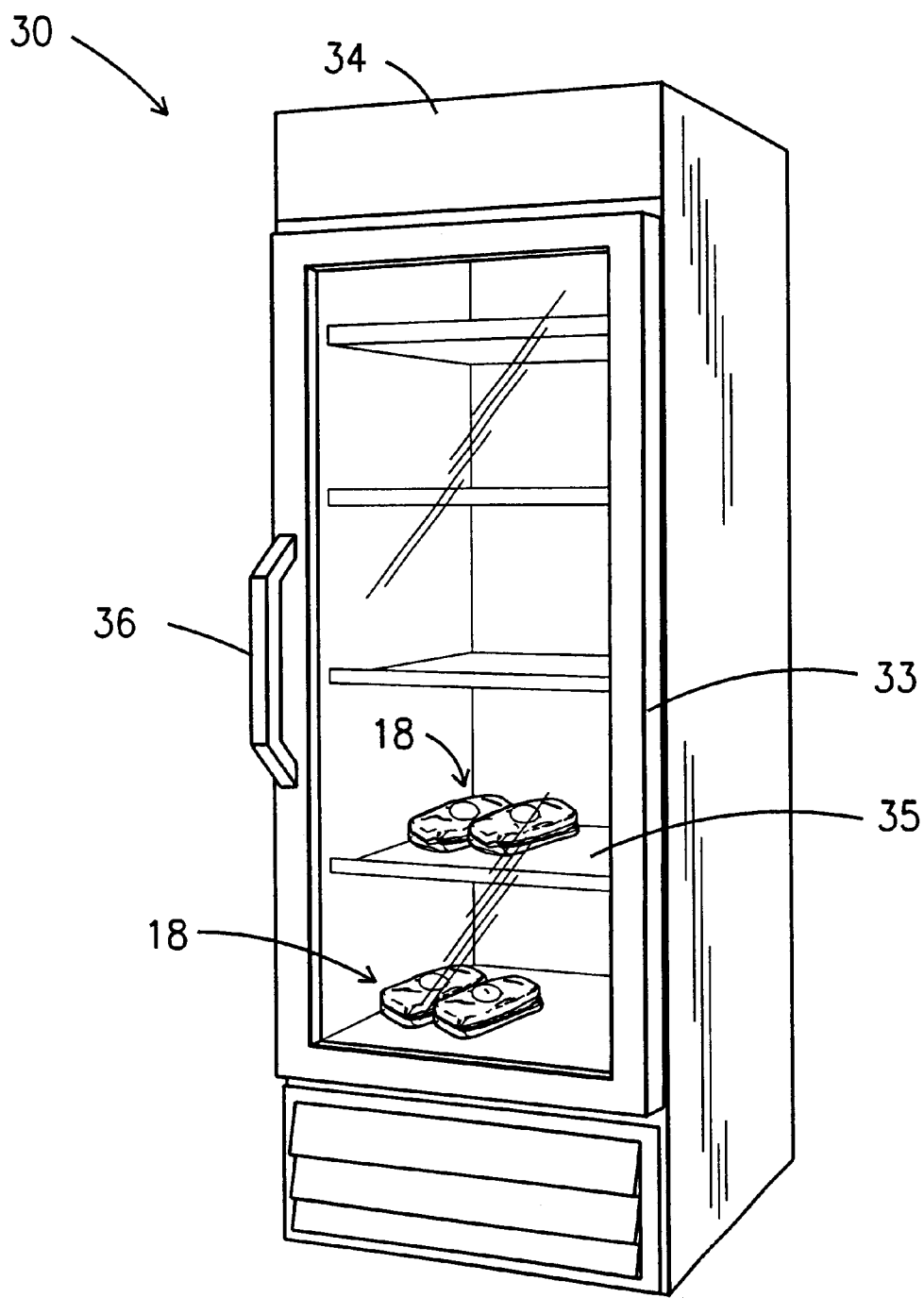
FIG. 4 is a perspective view of a plurality of sandwiches placed for sale in a refrigerated merchandiser according to the present invention.

Packages 20 of wrapped sandwiches 18 are then distributed to store locations. The packaging techniques employed should give the sandwiches 18 a packaged shelf life of at least 20 days, and preferably about 30 days. When properly prepared and refrigerated, bulk packaged sandwiches according to the present invention have achieved shelf lives of 42 days. Retail store locations typically possess substantial refrigerated storage space and a suitable refrigerated display 30 as shown in FIG. 4. One suitable display is the Model CBM 2160 Cold Merchandiser available from Seaga Manufacturing, Inc. of Freeport, Ill. Refrigerated merchandisers preferably are thermostat-controlled, have a clear door or walls, may have a hinged or sliding door 33 to permit consumer access, and a top with an optional sign board location 34 for promotional purposes. Illustrated merchandiser door 33 has handle 36 and hinges to facilitate customer access to the sandwiches 18. Alternative merchandisers may be built-in self-service refrigeration displays or displays where sandwiches are viewed and identified by the consumer and then retrieved and delivered to the consumer by store personnel.

Refrigerated packaging is particular attractive for resale through convenience stores which generally have ample refrigerated space but only a limited amount of freezer space. Furthermore, frozen sandwiches present difficulties in thawing that are not encountered with refrigerated product.

Stores are advised to keep the packaged sandwiches 18 refrigerated at approximately 35 to 40 degrees Fahrenheit until ready for use. When it is desired to offer sandwiches 18 for sale, a package 20 of sandwiches 18 is opened at the store location. The sandwiches 18 are then placed in a refrigerated display still wrapped in wrapping paper 11. Instructions on the bulk package 20 of sandwiches provide that once the package is opened all sandwiches should be removed and placed in a sales location. In this fashion, partial opened packages of sandwiches will not inadvertently remain in the refrigerated storage areas and spoil.

In a store, refrigerated sandwiches 18 are usually placed in a cooler on a display shelf 35. The thermostat of the refrigerated merchandisers 30 should be set to maintain the sandwiches 18 at a maximum 40 degrees Fahrenheit temperature. The display shelf life of the refrigerated sandwiches 18 in the merchandiser 30 is approximately 14 days. The extended shelf life after opening the modified atmosphere package is believed to be attributable to a substantial reduction in bacterial populations during the period of modified atmospheric storage. In a convenience store, the merchandiser 30 is preferably placed in full view, possibly near the store check out counter or coffee machine, and generates both directed and impulse sales. The customer who wishes to purchase a sandwich 18 may simply open the door 33 of refrigerated merchandiser 30, and pick up a sandwich 18 and take it to the check out counter of the store. Not only does the wrapper 11 provide some protection from customer handling, but it also permits the store operator to handle the sandwiches 18 from package 20 to merchandiser 30 in a sanitary fashion without actually touching the sandwich 10.

Condiments such as mustard and mayonnaise are not placed on the bulk package sandwiches during the assembly process. This is both to preserve customer choice and to prevent the absorption of excess moisture by the bread portions of the sandwiches. Packaged condiments may be made available for customers at the point of sale.

Figure 5:
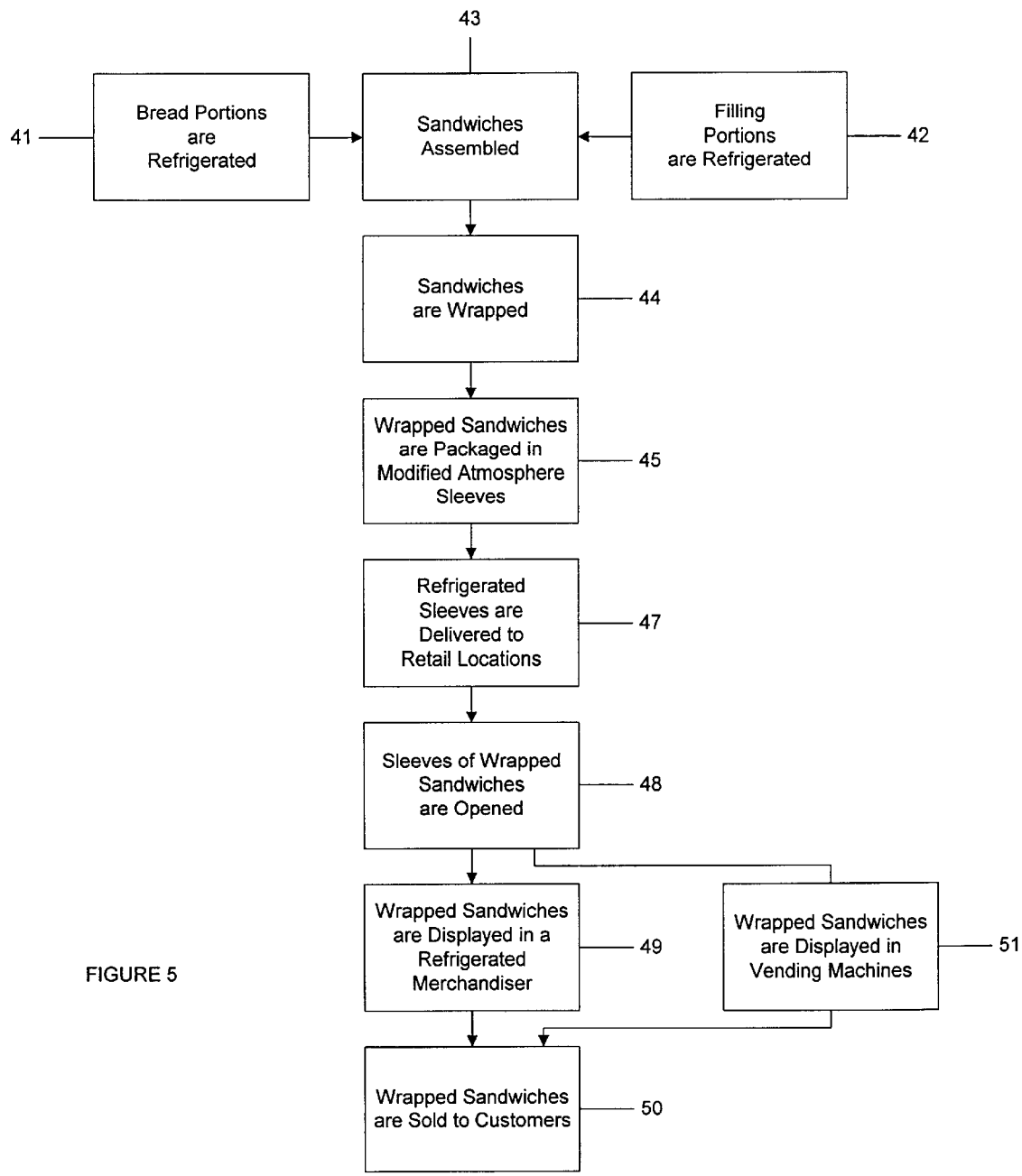
FIG. 5 is a flow chart describing the method of packaging, distributing, and selling sandwiches according to the present invention.

FIG. 5 provides a flow chart of the assembly and distribution process of the present invention. Specifically, bread is refrigerated in step 41, and the cooked meat, cheese or spread to be placed in the sandwich is in refrigerated condition in step 42. Bread and the filling are brought together in step 43 for assembly, which involves slicing the bread and inserting the filling between the bottom 12 and top 14 bread portions. In step 44, the sandwiches 10 are wrapped in wrappers 11, and thence proceed to step 45 for modified atmosphere packaging into sleeves 20 as described in connection with FIG. 3. The sandwiches 18 packaged in sleeves 20 remain refrigerated for delivery to individual store locations 47 or to other merchandisers. When ready for use, packages 20 are opened at the store locations or by vending route personnel in step 48. Then in step 49, the wrapped sandwiches 18 are placed in the merchandiser 30.

In the case of a vending merchandiser, packages 20 are opened as needed when vending machines are serviced and refilled, and any excess sandwiches 10 from an open package are kept refrigerated and placed in the next vending machine on the route 51. Finally, step 50 shows the successful sale of the wrapped sandwiches 18 to consumers.

Although the present invention has been described with reference to certain preferred embodiments disclosed in detail, it is to be understood that this is for the purpose of illustrating the invention, and should not be construed as necessarily limiting the scope of the invention since it is apparent that many changes may be made to the disclosed components and procedures by those skilled in the art to suit particular applications.

We claim:

1. A method for manufacturing and distributing a refrigerated bulk package sandwiches having low oxygen content comprising the steps of:
   (a) assembling a plurality of sandwiches from a plurality of bread portions and a plurality of filling portions;
   (b) wrapping the plurality of sandwiches in a gas permeable wrap;
   (c) packaging the plurality of wrapped sandwiches in a modified atmosphere container having an oxygen content between about 0.2%–0.5%;
   (d) delivering the container to a retail location;
   (e) maintaining the container in refrigerated storage for at least one day;
   (f) opening the container and displaying the wrapped sandwiches at the retail location; and
   (g) maintaining the displayed, wrapped sandwiches in a refrigerated condition until sale.

2. The method of claim 1 wherein the gas permeable wrap has an outer surface which displays a designation of a type of sandwich.

3. The method of claim 1 wherein the container comprises plastic webs that are oxygen and moisture resistant.

4. The method of claim 1 wherein the gas permeable wrap is a clear heat shrink film.

5. The method of claim 1 wherein the number of sandwiches assembled, wrapped, and packaged is between about three and twelve.

6. The method of claim 1 wherein the number of sandwiches assembled, wrapped, and packaged is between five and eight.

7. The method of claim 5 wherein the plastic webs comprise a top web and a bottom web with layers of nylon and EVOH that is formed to receive wrapped sandwiches, is subsequently filled with the plurality of wrapped sandwiches and the bottom web is then joined to the top web at their edges.

8. The method of claim 1 wherein the filling portions are selected from at least one of turkey, roast beef, chicken and ham.

9. The method of claim 8 wherein a cheese portion is included in the assembly of the sandwiches.

10. A refrigerated bulk package having a low oxygen content of sandwiches comprising:
    (a) at least three sandwiches, each assembled by placing a filling portion between a top bread portion and a bottom bread portion;
    (b) a gas permeable wrapper about each of said at least three sandwiches;
    (c) a transparent plastic bottom web having an edge within which the plurality of wrapped sandwiches are positioned; and
    (d) a top web having an edge joined to the edge of the bottom web and thereby encasing the plurality of wrapped sandwiches within said top and bottom webs.

11. The refrigerated bulk package of sandwiches of claim 10 wherein a designator for the type of sandwich is visible on the wrapper.

12. The refrigerated bulk package of sandwiches of claim 10 wherein the oxygen content of the package is between about 0.2 and about 0.5 percent.

13. The refrigerated bulk package of sandwiches of claim 10 wherein a pocket to receive the at least three sandwiches is formed in the bottom web which is comprised of layers of nylon and EVOH.

14. The refrigerated bulk package of sandwiches of claim 10 wherein the edges of the top web and the bottom web are joined by a peelable seal.

15. The refrigerated bulk package of sandwiches of claim 10 wherein at least three sandwiches are between from five to eight sandwiches.

16. The refrigerated bulk package of sandwiches of claim 10 wherein the filling portions are selected from at least one of turkey, roast beef, chicken, and ham.

17. The refrigerated bulk package of sandwiches of claim 16 wherein at least one of said three sandwiches further comprises a cheese portion.

18. A method for manufacturing and distributing sandwiches comprising the steps of:
    (a) assembling at least three sandwiches from a plurality of bread portions and a plurality of filling portions;
    (b) individually wrapping the at least three sandwiches in a gas permeable wrap having an outer surface displaying a designation of a type of sandwich;
    (c) packaging the at least three sandwiches in a modified atmosphere process so that the package contains between about 0.2% and 0.5% oxygen, by forming a pocket in a transparent bottom web with layers of EVOH and nylon, filling the pocket with the at least three sandwiches and joining a top web to the bottom web at their edges;
    (d) delivering the at least three packaged sandwiches to a retail location;
    (e) opening the modified atmosphere packaging; and
    (f) displaying refrigerated, wrapped sandwiches at the retail location in a thermostat controlled merchandiser at less than about 40 degrees Fahrenheit.

* * * * *